(12) United States Patent
Tanaka et al.

(10) Patent No.: US 6,267,919 B1
(45) Date of Patent: Jul. 31, 2001

(54) METHOD OF PRODUCING A THREE-DIMENSIONAL OBJECT

(75) Inventors: Kazuhiko Tanaka; Mitsuo Uchiyama; Teishirou Shibazaki; Teruo Fukumura, all of Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/251,465

(22) Filed: Feb. 17, 1999

(30) Foreign Application Priority Data

Feb. 19, 1998 (JP) .................................................. 10-037698
Mar. 24, 1998 (JP) .................................................. 10-075841

(51) Int. Cl.$^7$ .......................... B29C 35/08; B29C 41/02; G06F 17/50; G06F 19/00
(52) U.S. Cl. ........................ 264/401; 425/174.4; 700/120
(58) Field of Search ........................... 264/401; 700/120; 425/174.4

(56) References Cited

U.S. PATENT DOCUMENTS

| | | |
|---|---|---|
| 4,929,402 | 5/1990 | Hull . |
| 4,999,143 | 3/1991 | Hull et al. . |
| 5,059,359 | 10/1991 | Hull et al. . |
| 5,104,592 | 4/1992 | Hull et al. . |
| 5,130,064 | 7/1992 | Smalley et al. . |
| 5,137,662 | 8/1992 | Hull et al. . |
| 5,174,943 | 12/1992 | Hull . |
| 5,182,055 | 1/1993 | Allison et al. . |
| 5,184,307 | 2/1993 | Hull et al. . |
| 5,192,559 | 3/1993 | Hull et al. . |
| 5,234,636 | 8/1993 | Hull et al. . |
| 5,236,637 | 8/1993 | Hull . |
| 5,248,456 | 9/1993 | Evans, Jr. et al. . |
| 5,256,340 | 10/1993 | Allison et al. . |
| 5,273,691 | 12/1993 | Hull et al. . |
| 5,344,298 | 9/1994 | Hull . |
| 5,345,391 | 9/1994 | Hull et al. . |
| 5,355,318 * | 10/1994 | Dionnet et al. ...................... 700/120 |
| 5,447,822 | 9/1995 | Hull et al. . |
| 5,554,336 | 9/1996 | Hull . |
| 5,556,590 | 9/1996 | Hull . |
| 5,569,431 | 10/1996 | Hull . |
| 5,571,471 | 11/1996 | Hull . |
| 5,573,722 | 11/1996 | Hull . |
| 5,597,520 | 1/1997 | Smalley et al. . |
| 5,609,812 | 3/1997 | Childers et al. . |
| 5,609,813 | 3/1997 | Allison et al. . |
| 5,630,981 | 5/1997 | Hull . |
| 5,637,169 | 6/1997 | Hull et al. . |
| 5,651,934 | 7/1997 | Almquist et al. . |
| 5,711,911 | 1/1998 | Hull . |
| 5,762,856 | 6/1998 | Hull . |
| 5,772,947 | 6/1998 | Hull et al. . |
| 5,779,967 | 7/1998 | Hull . |
| 5,785,918 | 7/1998 | Hull . |
| 5,814,265 | 9/1998 | Hull . |
| 5,855,836 | 1/1999 | Leyden et al. . |
| 5,870,307 | 2/1999 | Hull et al. . |
| 5,891,382 | 4/1999 | Almquist et al. . |
| 5,902,537 | 5/1999 | Almquist et al. . |
| 5,989,476 | 11/1999 | Lockard et al. . |
| 6,027,324 | 2/2000 | Hull . |
| 6,036,911 | 3/2000 | Allison et al. . |
| 6,048,188 | 4/2000 | Hull et al. . |
| 6,048,487 | 4/2000 | Almquist et al. . |
| 6,067,206 | 5/2000 | Hull et al. . |

FOREIGN PATENT DOCUMENTS 6-71761    3/1994    (JP) .

* cited by examiner

*Primary Examiner*—Leo B. Tentoni
(74) *Attorney, Agent, or Firm*—Foley & Lardner

(57) ABSTRACT

A three-dimensional object is produced by sequentially laminating a plurality of layers. The method includes setting a plurality of coordinate points at a predetermined interval on a profile of a model section corresponding to a layer to be formed, obtaining information regarding distances between a plurality of the coordinate points, and scanning a photo-curing resin solution with light from a light source, in correspondence with a direction of a straight line passing through mated coordinate points giving a distance shorter than a maximum value among the distances between a plurality of the coordinate points.

21 Claims, 11 Drawing Sheets

METHOD OF PRODUCING A THREE-DIMENSIONAL OBJECT

BACKGROUND OF THE INVENTION

The present invention relates to a method of producing a cubic or three-demensional model and, more particularly, to a method of producing a cubic three-demensional object model by the use of a photo-curing resin that can be cured by light irradiation.

Japanese Patent Application Laid-Open Publication No. 6-71761 discloses providing a vertically displaceable rise/fall table within a photo-curing resin solution accommodated in a vessel, scanning the photo-curing resin solution while irradiating a light from above a liquid surface of the solution toward the rise/fall table within the solution, repeating the formation of a cured layer having a predetermined thickness on the rise/fall table, and thereby obtaining the cured layers sequentially laminated so that a cubic or three-demensional model is produced.

SUMMARY OF THE INVENTION

According to the analyses made by the inventors of this application, as the patterns of scan of light that are used when forming the above-described cured layers there can be taken up by way of example a linear pattern extending along the X axis, a linear pattern extending along the Y axis, a concentric pattern, a concentric-polygonal pattern, etc. illustrated in FIG. 19. Among these scanning patterns, the linear patterns extending the X and Y axes are simple and convenient to use and therefore are preferable.

However, in a case where as illustrated in FIG. 20 on a cured layer Wa formed one layer before there is formed a cured layer Wb whose profile is at least partially larger than the profile of the layer Wa and where a portion that has been cured by initial scanning corresponds to a portion indicated by the arrow mark (a), even when adopting such a linear scanning pattern, because of the simplicity and convenience this cured portion floats on the photo-curing resin solution and becomes unstable. Portions indicated by the arrow marks (b) to (j) that are formed respectively adjacently by being sequentially scanned also floats by being influenced by the occurrence of the floating condition of the previously mentioned floating portion also becomes unstable.

Specifically, as the case where on the cured layer Wa formed one layer before there is formed the cured layer Wb whose profile is at least partially larger than the profile of the layer Wa, there can be taken up by way of example a case where manufacture is made of a cubic model W1 shaped so as to have an overhang, illustrated in FIG. 21A or a case where manufacture is made of a cubic model W2 shaped like a bridge, illustrated in FIG. 21B. When the cured portion corresponding to such an overhang portion or bridge portion is floated, a phenomenon such as peeling or sagging inconveniently occurs in the cubic model that has been manufactured.

As a countermeasure against this, it is considered to provide supports Ws, Ws' such as those illustrated in FIG. 21A or 21B to thereby prevent the occurrence of peeling or sagging due to the floatation of an overhang portion or the like.

However, for example, where manufacturing a cubic model serving as a cylinder head of an engine, since the water jacket has complex cubic cavity portions, extreme difficulties arise in removing the supports after having manufactured this cubic model.

Accordingly, in a case where producing a cubic model constituting a three-dimensional article having a complex cubic configuration by the use of a photo-curing resin solution, it can be said that there is expected the appearance of a method of enabling the accurate production of such a cubic model constituting an article having a complex configuration by scanning a light with the use of a simple and convenient scanning mechanism without being exhibited by a phenomenon such as peeling or sagging.

An object of the present invention is to provide a method of enabling, in a case where producing a cubic model constituting a three-dimensional article having a complex cubic or three-demensional configuration by the use of a photo-curing resin solution, the accurate production of such a cubic model constituting an article having a complex configuration by scanning a light with the use of a simple and convenient scanning mechanism without exhibiting a phenomenon such as peeling or sagging.

To attain the above object, a method of producing a cubic model according to the present invention is one which produces a cubic model by laminating a plurality of layers sequentially, and which comprises the step of preparing a light source, the step of preparing a photo-curing resin solution, the step of setting a plurality of coordinate points at a predetermined interval on a profile of a model section corresponding to a layer to be formed, the step of obtaining information regarding distances between a plurality of the coordinate points, and the step of scanning on the photo-curing resin solution while irradiating a light emitted from the light source, in correspondence with a direction of a straight line passing through mated coordinate points giving a distance shorter than a maximum value among the distances between a plurality of the coordinate points, so as to form the layer to be formed as a cured layer.

With the above-described construction, it is possible to produce accurately the cubic model constituting an article having a complex configuration by the use of a photo-curing resin solution by scanning the light over the solution with a simple and convenient scanning mechanism without exhibiting a phenomenon such as peeling or sagging.

DETAILED DESCRIPTION OF THE PREFERRED EMBODIMENTS

Respective embodiments of the present invention will hereafter be explained in detail while referring suitably to the drawings.

First, a method of producing a cubic model according to a first embodiment of the present invention will be explained with reference to FIGS. 1 to 4.

Figure 1:
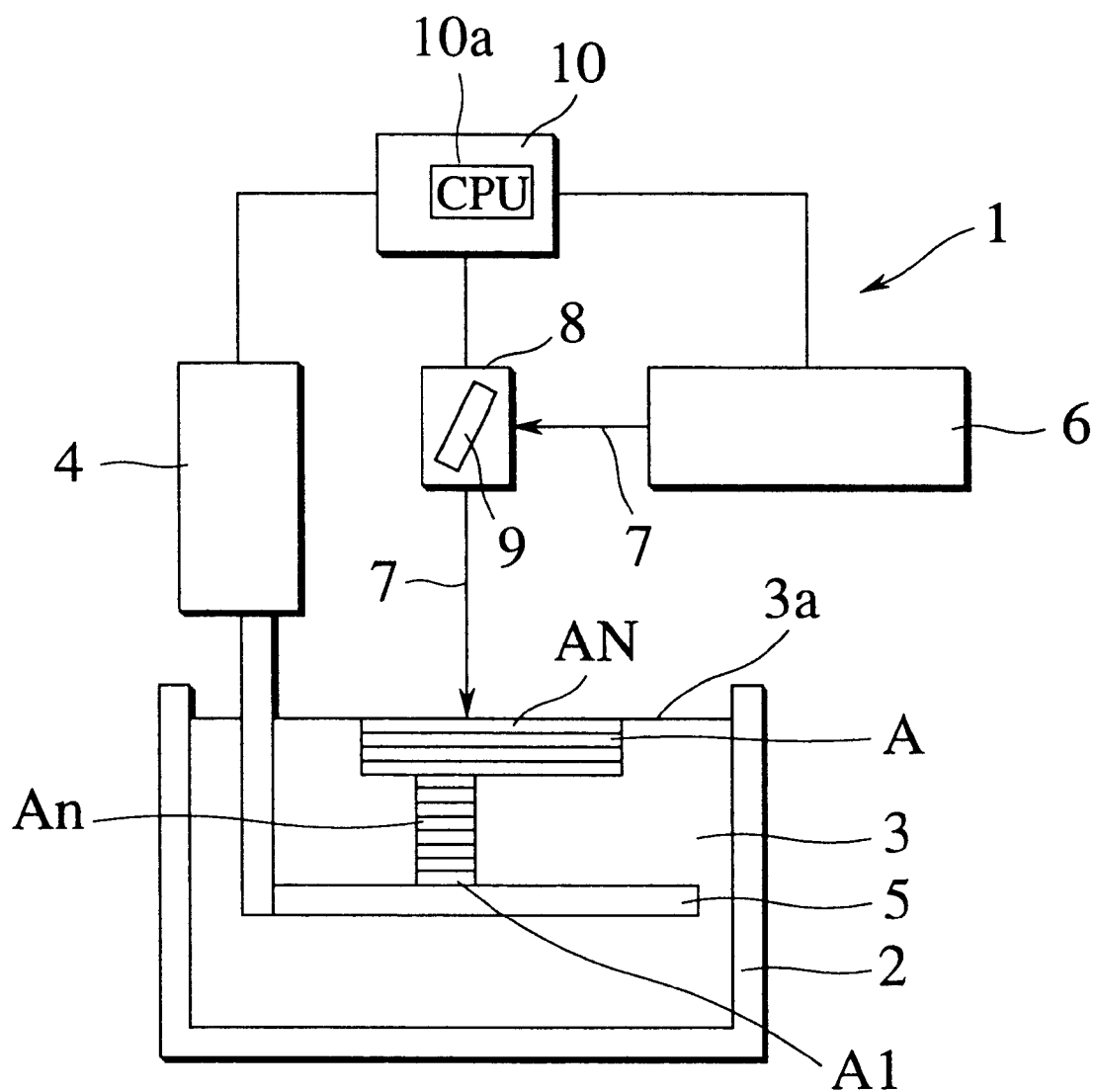
FIG. 1 is a schematic constructional view illustrating a producing apparatus used for execution of a method of producing a cubic model according to a first embodiment of the present invention.

As illustrated in FIG. 1, a cubic model producing apparatus 1 comprises an accommodation vessel 2 in which a photo-curing resin solution 3 is accommodated. A vertically displaceable or, a rise/fall table 5 is provided in such a way as to be movable by being vertically raised and lowered by a table driving unit 4 so as to be immersed in the photo-curing resin solution 3 within the accommodation vessel 2. Further, toward the rise/fall table 5, a laser light 7 emitted from a laser light source 6 is irradiated through a mirror 9 driven by a mirror driving unit 8 so as to scan a liquid surface 3a of the photo-curing resin solution 3 in planar. It is to be noted that the respective operations of raising and lowering the rise/fall table 5 by the table driving unit 4, emitting the laser light 7 from the laser light source 6, and rotating the mirror 9 by the mirror driving unit 8 are controlled using a CPU 10a within a controller 10.

With the above-described construction, by combining suitably with one another the operations of raising and lowering the rise/fall table 5 by the table driving unit 4, emitting the laser light 7 from the laser light source 6, and rotating the mirror 9 by the mirror driving unit 8, that are controlled using the CPU 10a within the controller 10, the laser light 7 is irradiated onto the liquid surface 3a of the photo-curing resin solution 3 on the rise/fall table 5 immersed in the photo-curing resin solution 3 within the accommodation vessel 2 while scanning the surface 3a sequentially in accordance with a predetermined irradiation pattern, thereby producing a cubic model A. It is to be noted that this cubic model A is one which is produced by laminating each of cured layers $A_n$ covering from $A_1$ to $A_N$. Here, $1 \leq n \leq N$ (n represents a positive integer and N represents an integer equal to or greater than 2).

More specifically, first, the controller 10 performs positioning of the rise/fall table 5 through the table driving unit 4 in such a way that the table 5 is immersed in the photo-curing resin solution 3 by a predetermined depth.

Next, the controller 10 irradiates the laser light 7, while controlling the operations of emitting the laser light 7 from the laser light source 6 and rotating the mirror 9 by the mirror driving unit 8, onto the liquid surface 3a of the photo-curing resin solution 3 on the rise/fall table 5 while scanning the surface 3a linearly a plurality of times, thereby forming each of the cured layer $A_n$ having a predetermined configuration.

Figure 2:
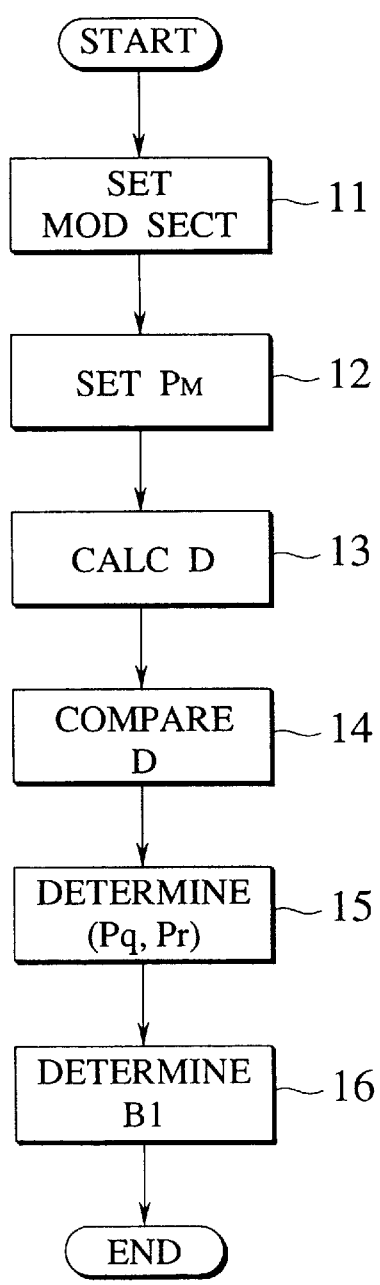
FIG. 2 is a flow chart for determining the direction of scanning lines of a laser light according to the first embodiment.

Here, an explanation will be given of a calculation process performed by the CPU 10a of the controller 10 with reference to FIG. 2. In this embodiment, although an article to which the method of producing the cubic model regarding the present invention is applied is mainly described as the cured layer $A_1$, it is needless to say that the method can be applied to another cured layer other than the cured layer $A_1$ as required.

First, as illustrated in step 11, a model section or slice is set in correspondence with the cured layer $A_1$. It is to be noted that such model section corresponds to a section obtained by cutting the cured layer $A_1$ at a position corresponding to a predetermined thickness of the cured layer $A_1$ in a direction orthogonally crossing the direction in which the laser light 7 is irradiated toward the rise/fall table 5. It is also to be noted that according to the necessity the lowermost or uppermost surface of the cured layer $A_1$ may be used as the model section. Further, it is also to be noted that the model section may be set by use of design data of the cured layer $A_1$, or also set by use of experimental data of the cured layer $A_1$.

Figure 3:
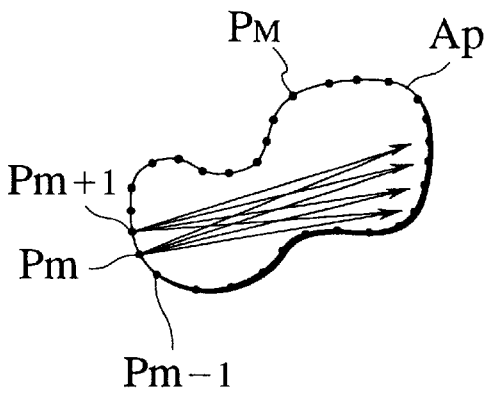
FIG. 3 is an illustration for determining the direction of scanning lines of a laser light according to the first embodiment.

Next, as illustrated in step 12 and in FIG. 3, a plurality of coordinate points $P_M$ are set at predetermined intervals on a profile Ap of a model section or slice set in correspondence with the cured layer $A_1$. Here, M represents an integer equal to or greater than 2.

Next, as illustrated in step 13 and in FIG. 3, calculation is made so as to obtain distances D between respective coordinate points $P_M$ set on the profile Ap at predetermined intervals. Specifically, the distances D are obtained by using a certain coordinate point $P_m$ among the coordinate points $P_M$ as a basis and calculating the distance from the coordinates point $P_m$ to every one of the coordinate points other than this coordinate point $P_m$, subsequently using a coordinate point $P_{m+1}$ adjacent to the coordinate point $P_m$ as a basis and calculating the distance from this coordinate point $P_{m+1}$ to every one of the coordinate points other than the coordinate point $P_{m+1}$, and thereafter sequentially repeating this calculation until one round is made of the profile Ap.

Next, as illustrated in step 14, comparison is made of the distances D between the respective coordinate points $P_M$ that are set on the profile Ap at predetermined intervals.

Figure 4:
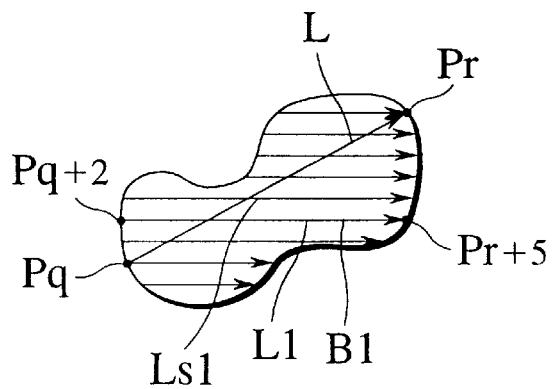
FIG. 4 is an illustration for determining the direction of scanning lines of a laser light according to the first embodiment.

Next, as illustrated in step 15 and in FIG. 4, there are determined mated (viz. paired) coordinate points ($P_q$, $P_r$) that give a maximum value Dab of the distances D.

And, as illustrated in step 16 and in FIG. 4, the direction of a straight line L1 deviated by a predetermined amount from the direction of a straight line L obtained by connecting the mated coordinate points ($P_q$, $P_r$) that give the maximum value $D_{MAX}$ of the distances D, namely, inclined by a predetermined angle with respect to the mated coordinate points ($P_q$, $P_r$), is determined as the scanning direction B1 of a scanning line Ls1, whereby the process of determining the scanning direction for forming the cured layer $A_1$ is terminated. It is to be noted that in this embodiment, concretely, the direction of a straight line obtained by connecting a coordinate point $P_{q+2}$ spaced by two coordinate points from the coordinate point $P_q$ and a coordinate point $P_{r+5}$ spaced five coordinate points from the coordinate point $P_r$ has been determined as the scanning direction B1.

Upon termination of the above-described calculation process, the flow proceeds to a step for actually forming the cured layer $A_1$, in which the controller 10 causes the rise/fall table 5 to be located at a position having a predetermined depth within the photo-curing resin solution 3 by the use of the table driving unit 4.

Next, the controller 10 causes the laser light 7 to be irradiated, while controlling the operations of emitting the laser light 7 from the laser light source 6 and rotating the mirror 9 by the mirror driving unit 8, along scanning lines Ls1 parallel with the scanning direction B1 previously determined and spaced by a predetermined distance from each other while scanning along the same linearly, thereby forming the cured layer $A_1$.

And, thereafter, in the same way, a cured layer $A_2$, cured layer $A_3$, ... are sequentially formed to thereby form finally a cubic model A having an overhang configuration.

As described above, in the method of producing the cubic model according to this embodiment, the direction of the scanning lines of the laser light is deviated from the direction of the straight line obtained by connecting the mated coordinate points that give the maximum value of the distances between the respective coordinate points set on the profile of the model section at predetermined intervals. This means that each length of the scanning lines of the laser light shortens with the result that the direction of the scanning lines is deviated from a direction maximizing the amount of shrinkage at the time when the photo-curing resin has been cured, and means that as a result the peeling between the cured layers or the sagging from the cured layers, due to the shrinkage occurring when the photo-curing resin is cured, can be effectively avoided.

Accordingly, in this embodiment, the occurrence of peeling or the like at the time of producing a cubic model having an overhang configuration, bridge configuration, etc. can be effectively suppressed and therefore can reduce the number of supports for preventing such peeling or the like or require the use of no support therefor. This makes it possible to produce the cubic model having a sufficient precision while simplifying the production of the cubic model having a cavity portion of a complex configuration such as a water jacket, etc.

Next, a method of producing a cubic model according to a second embodiment of the present invention will be explained with reference to FIGS. 5 and 6.

In this second embodiment, the cubic model producing Apparatus used in this embodiment is the same as in the case of the first embodiment. Shortening each length of the scanning lines of the laser light and resultantly setting the direction of the scanning lines to be a direction other than the direction maximizing the amount of shrinkage at the time of curing of the photo-curing resin, also, are the same as in the case of the first embodiment but differ therefrom in respect of the concrete way concerned with the shortening each length of the scanning lines and its resultantly setting thereof.

Figure 5:
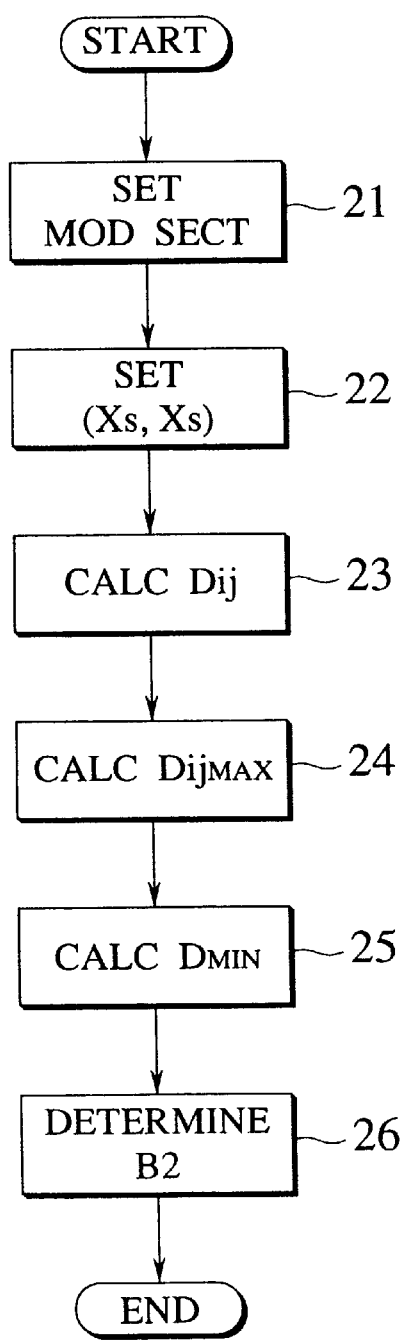
FIG. 5 is a flow chart for determining the direction of scanning lines of a laser light in a method of producing a cubic model according to a second embodiment of the present invention.

Specifically, the following calculation process illustrated in FIG. 5 is executed by the CPU 10a of the controller 10.

First, as illustrated in step 21, a model section is set as in the case of the first embodiment in correspondence with the cured layer $A_1$.

Next, as illustrated in step 22, coordinate points ($X_s$, $Y_s$) are set at predetermined intervals on the profile Ap of the model section set in correspondence with the cured layer $A_1$. Here, S represents an integer equal to or greater than 2.

Next, as illustrated in step 23, the distance $D_{ij}$ between any two coordinate points ($X_i$, $Y_i$) and ($X_j$, $Y_j$) among the coordinate points ($X_s$, $Y_s$) set at the predetermined intervals on the profile Ap is calculated in regard to every one of the distances of the coordinate points ($X_i$, $Y_i$) and ($X_j$, $Y_j$), in accordance with the formula $D_{ij}=((X_i-X_j)^2+(Y_i-Y_j)^2)^{1/2}$. Here, i≠j.

Next, as illustrated in step 24, calculation is made to obtain a maximum value $D_{ijMAX}$ of the distances $D_{ij}$ obtained when having set each of the coordinate points ($X_i$, $Y_j$) as a basis.

Next, as illustrated in step 25, there is sequentially compared the maximum value $D_{ijMAX}$ of the distances $D_{ij}$ that have been obtained in step 24 when having set each of the coordinate points ($X_i$, $Y_i$) as a basis to thereby determine a minimum value $D_{MIN}$ of the maximum values $D_{ijMAX}$. Specifically, a maximum value $D_{sjMAX}$ of the distances obtained when having set a coordinate point ($X_s$, $Y_s$) among the coordinate points ($X_s$, $Y_s$) as a basis is compared with a maximum value $D_{(s-1)jMAX}$ of the distances obtained when having set a coordinate point ($X_{(s-1)}$, $Y_{(s-1)}$) among the coordinate points ($X_s$, $Y_s$) as a basis to thereby select a maximum value which is smaller. Subsequently, such obtained smaller maximum value is compared with a maximum value $D_{(s-2)jMAX}$ of the distances obtained when having set the coordinate point ($X_{(s-2)}$, $Y_{(s-2)}$) among the coordinate points ($X_S$, $Y_S$) as a basis to thereby select a smaller maximum value. Thereafter, this procedure is sequentially repeated.

Figure 6:
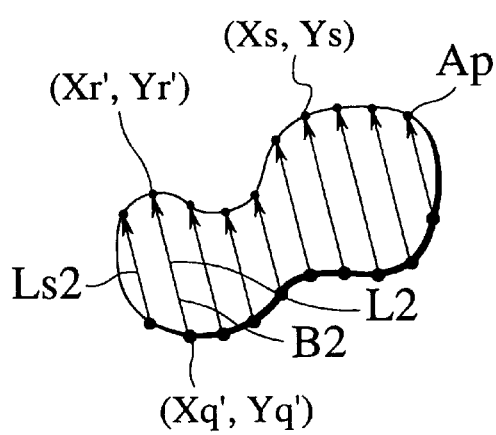
FIG. 6 is an illustration for determining the direction of scanning lines of a laser light according to the second embodiment.

Next, as illustrated in step 26 and in FIG. 6, the direction of a straight line L2 obtained by connecting the coordinate point ($X_{q'}$, $Y_{q'}$) and coordinate point ($X_{r'}$, $Y_{r'}$) which give the minimum value $D_{MIN}$ among the maximum values $D_{ijMAX}$ of the distances obtained when having set the respective coordinate points ($X_i$, $Y_i$) as bases is determined as a scanning direction B2, whereby the process of determining the scanning direction for the formation of the cured layer $A_1$ is terminated.

Upon termination of the above-described calculation process, the flow proceeds to a step for actually forming the cured layer $A_1$ as in the case of the first embodiment, in which the controller 10 causes the laser light 7 to be irradiated along scanning lines Ls2 parallel with the scanning direction B2 determined in this way and spaced by a predetermined distance from each other while scanning along the scanning lines Ls2 linearly, thereby forming the cured layer $A_1$.

As described above, in the method of producing the cubic model according to this embodiment, the direction of the scanning lines of the laser light is set to be the direction of the shortest straight line among the longest straight lines each determined for each of the coordinate points set at predetermined intervals on the profile of the model section. This means that each length of the scanning lines of the laser light is smaller than the length of the longest straight lines maximizing the amount of shrinkage at the time when the photo-curing resin has been cured, and means that as a result the peeling between the cured layers or the sagging from the cured layers, due to the shrinkage occurring at the time when the photo-curing resin is cured, can be effectively avoided.

Accordingly, in this embodiment, also, the occurrence of peeling or the like at the time of producing the cubic model of a complex configuration such as an overhang configuration, bridge configuration, etc. can be effectively suppressed and therefore can reduce the number of supports for preventing such peeling or the like or require the use of no support therefor.

Next, a method of producing a cubic model according to a third embodiment of the present invention will be explained with reference to FIGS. 7 to 9.

In this third embodiment, the cubic model producing Apparatus the same as in the case of the first embodiment is used. Shortening each length of the scanning lines of the laser light and resultantly setting the direction of the scanning lines to be a direction other than the direction maximizing the amount of shrinkage at the time of curing of the photo-curing resin, also, are the same as in the case of the first or second embodiment but differ therefrom in respect of the concrete way concerned with the shortening each length of the scanning lines and its resultantly setting thereof.

Figure 7:
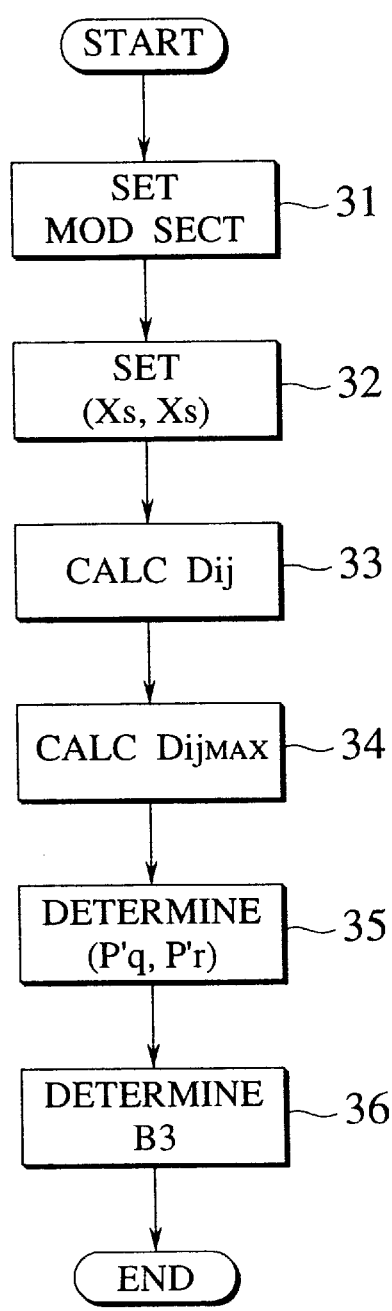
FIG. 7 is a flow chart for determining the direction of scanning lines of a laser light in a method of producing a cubic model according to a third embodiment of the present invention.

Specifically, the following calculation process illustrated in FIG. 7 is executed by the CPU 10a of the controller 10.

In FIG. 7, the processings of steps 31 to 34 are the same as in the case of the second embodiment.

Namely, during a time period from step 31 to step 34, regarding the distance $D_{ij}$ between any two given coordinate points $(X_i, Y_i)$ and $(X_j, Y_j)$ among the coordinate points $(X_s, Y_s)$ set at predetermined intervals on the profile Ap of the model section set in correspondence with the cured layer $A_1$, the maximum values $D_{ijMAX}$ that occur when having set the respective coordinate points $(X_i, Y_i)$ as a basis are respectively determined.

Figure 8:
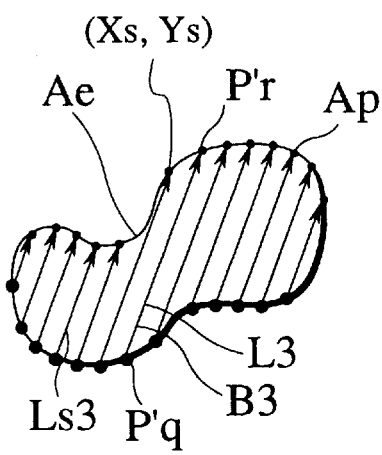
FIG. 8 is an illustration for determining the direction of scanning lines of a laser light according to the third embodiment.
Figure 9:
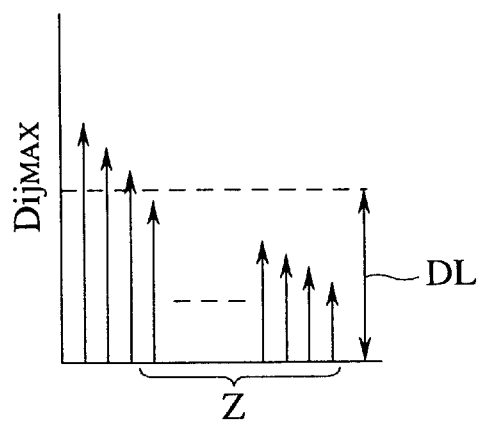
FIG. 9 graphically illustrates a threshold value for determining the direction of scanning lines of a laser light according to the third embodiment.

Next, as illustrated in step 35 and in FIG. 8, regarding the maximum value $D_{ijmax}$ of the distances $D_{ij}$ that have been obtained in step 34 when having set each of the coordinate points $(X_i, Y_i)$ as a basis, determination is made of mated coordinate points $(P'_q, P'_r)$ which give a length becoming shorter than a critical curing length DL which is determined from the physical values of the photo-curing resin and is a critical value permitting peeling or the like to occur at the time of curing of the photo-curing resin. Specifically, the maximum value $D_{sjmax}$ of the distances obtained when having set the coordinate point $(X_s, Y_s)$ as a basis is compared with the critical curing length DL, the maximum value $D_{(s-1)jMAX}$ of the distances obtained when having set the coordinate point $(X_{(s-1)}, Y_{(s-1)})$ as a basis is compared with the critical curing length DL, and so on. This procedure is repeated. Whereby, as illustrated in FIG. 9, the comparison between every one of the maximum values $D_{ijMAX}$ and the critical curing length DL is terminated and, from among mated coordinate points Z having their maximum values $D_{ijMAX}$ smaller than a length corresponding to the critical curing length DL, mated coordinate points giving the largest maximum value has been selected as $(P'_q, P'_r)$. Of course, according to the necessity at the time of production, from among the mated coordinate points Z having their maximum values $D_{ijMAX}$ smaller 1than the length corresponding to the critical curing length DL, mated coordinate points other than those giving the largest maximum value may be selected.

Next, as illustrated in step 36 andin FIG. 8, the direction of a straight line L3 obtained by connecting the thus-determined coordinate points $(P'_q, P'_r)$ to each other is determined as the scanning direction B3 of scanning lines Ls3, whereby the process of determining the scanning direction for the formation of the cured layer $A_1$ is terminated.

Upon termination of the above-described calculation process, the flow proceeds to a step for actually forming the cured layer $A_1$ as in the case of the first embodiment, in which the controller 10 causes the laser light 7 to be irradiated along scanning lines Ls3 parallel with the scanning direction B3 determined in this way and spaced by a predetermined distance from each other while scanning along the scanning lines Ls3 linearly, thereby forming the cured layer $A_1$.

As described above, in the method of producing the cubic model according to this embodiment, the direction of the scanning lines of the laser light is set to be the direction of the straight line shorter than that corresponding to the critical curing length, which is among the longest straight lines each determined for each of the coordinates points set at predetermined intervals on the profile of the model section. This means that each length of the scanning lines of the laser light is smaller than the length of the longest straight lines maximizing the amount of shrinkage at the time when the photo-curing resin has been cured and is shorter than that corresponding to a threshold value representing the critical curing length, and means that as a result the peeling between the cured layers or the sagging from the cured layers due to the shrinkage occurring at the time when the photo-curing resin is cured can be more reliably and effectively avoided while increasing the calculation processing speed.

Accordingly, in this embodiment, also, the occurrence of peeling or the like at the time of producing the cubic model of a complex configuration such as an overhang configuration, bridge configuration, etc. can be effectively suppressed and therefore can reduce the number of supports for preventing such peeling or the like or require the use of no support therefor.

Next, a method of producing a cubic model according to a fourth embodiment of the present invention will be explained with reference mainly to FIG. 10.

In this fourth embodiment, when forming each cured layer $A_n$, the interior of the profile $Ap_n$ of a model section corresponding to the cured layer $A_n$ is divided into four photo-scanning regions Aa, Ab, Ac and Ad by straight lines U1 and U2 set at a predetermined interval, and there is selected any one of the cubic model producing methods described in the first to third embodiments with respect to each one of the respective photo-scanning regions Aa, Ab, Ac and Ad. And, with the use of the thus-selected producing method, each cured layer $A_n$ is formed by linearly scanning the laser light 7 a plurality of times along each of scanning lines having a direction parallel to each other with a predetermined spacing provided therebetween determined correspondingly to the photo-scanning regions Aa, Ab, Ac and Ad. That is, in this case, the scanning direction of the laser light 7 is determined using the cubic model producing method of the first embodiment with respect to the photo-scanning region Aa, using the cubic model producing method of the second embodiment with respect to the photo-scanning regions Ab and Ad, and using the cubic model producing method of the third embodiment with respect to the photo-scanning region Ac.

Figure 10:
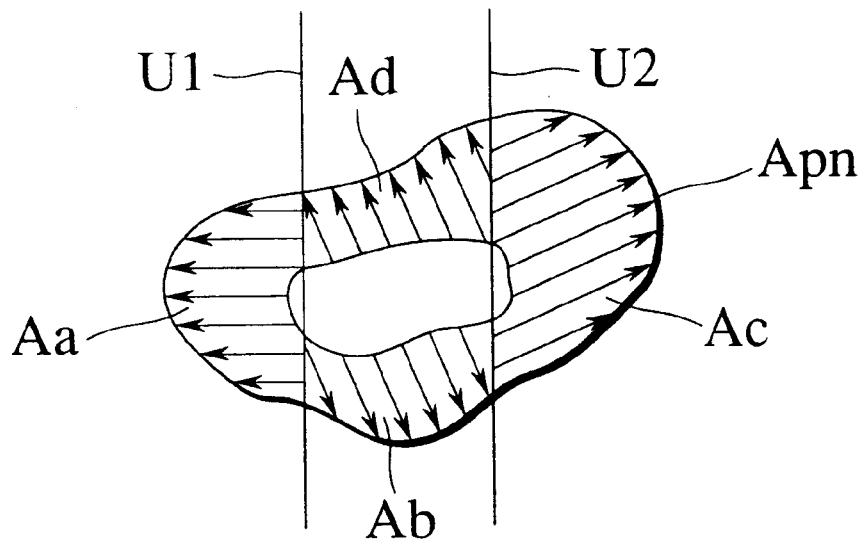
FIG. 10 is an illustration for determining the direction of scanning lines of a laser light in a method of producing a cubic model according to a fourth embodiment of the present invention.

In this way, in the above-described cubic model producing method, each length of the laser light scanning lines indicated by respective arrow marks in FIG. 10 becomes shorter in each of the respective photo-scanning regions Aa, Ab, Ac and Ad prepared by dividing into four regions interior of the profile $AP_n$ of the model section corresponding to each cured layer $A_n$, with the result that even if the area of the model section is large, the occurrence of peeling or the like at the time of curing is avoided. In addition, since the scanning direction of the laser light 7 differs for each of the respective photo-scanning regions Aa, Ab, Ac and Ad, the direction in which the resin is shrunk when cured is dispersed, i.e., the shrinkages when curing occurs are canceled one another, with the result that the production precision with which the cubic model A is produced becomes improved.

Figure 11:
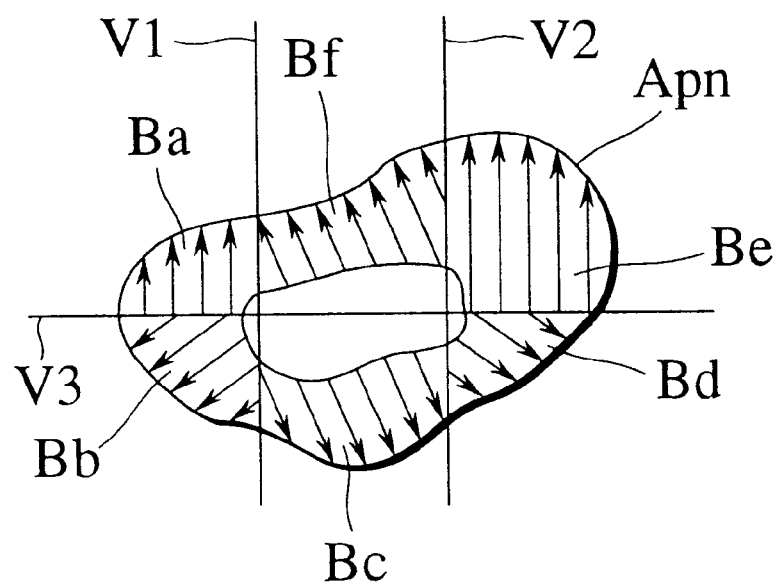
FIG. 11 is an illustration for determining the direction of scanning lines of a laser light in a modification of the method of producing a cubic model according to the fourth embodiment.

Additionally, although in this embodiment it is arranged that the interior of the profile $Ap_n$ of the model section corresponding to each cured layer $A_n$ is divided into four photo-scanning regions Aa, Ab, Ac and Ad by straight lines U1 and U2 set at predetermined intervals, the invention is not limited thereto. As another construction, for example, it may be also arranged that, as illustrated in FIG. 11, the interior of the profile $Ap_n$ of the model section corresponding to each cured layer $A_n$ is divided into six photo-scanning regions Ba, Bb, Bc, ,Bd, Be, and Bf by straight lines V1 and V2 set at predetermined intervals and straight lines V3 orthogonally crossing the straight lines V1 and V2. By dividing into a larger number of photo-scanning regions in this way, in even a case where it happens that the area of the model section is especially large, the occurrence of peeling or the like at the curing time can be prevented.

Figure 12:
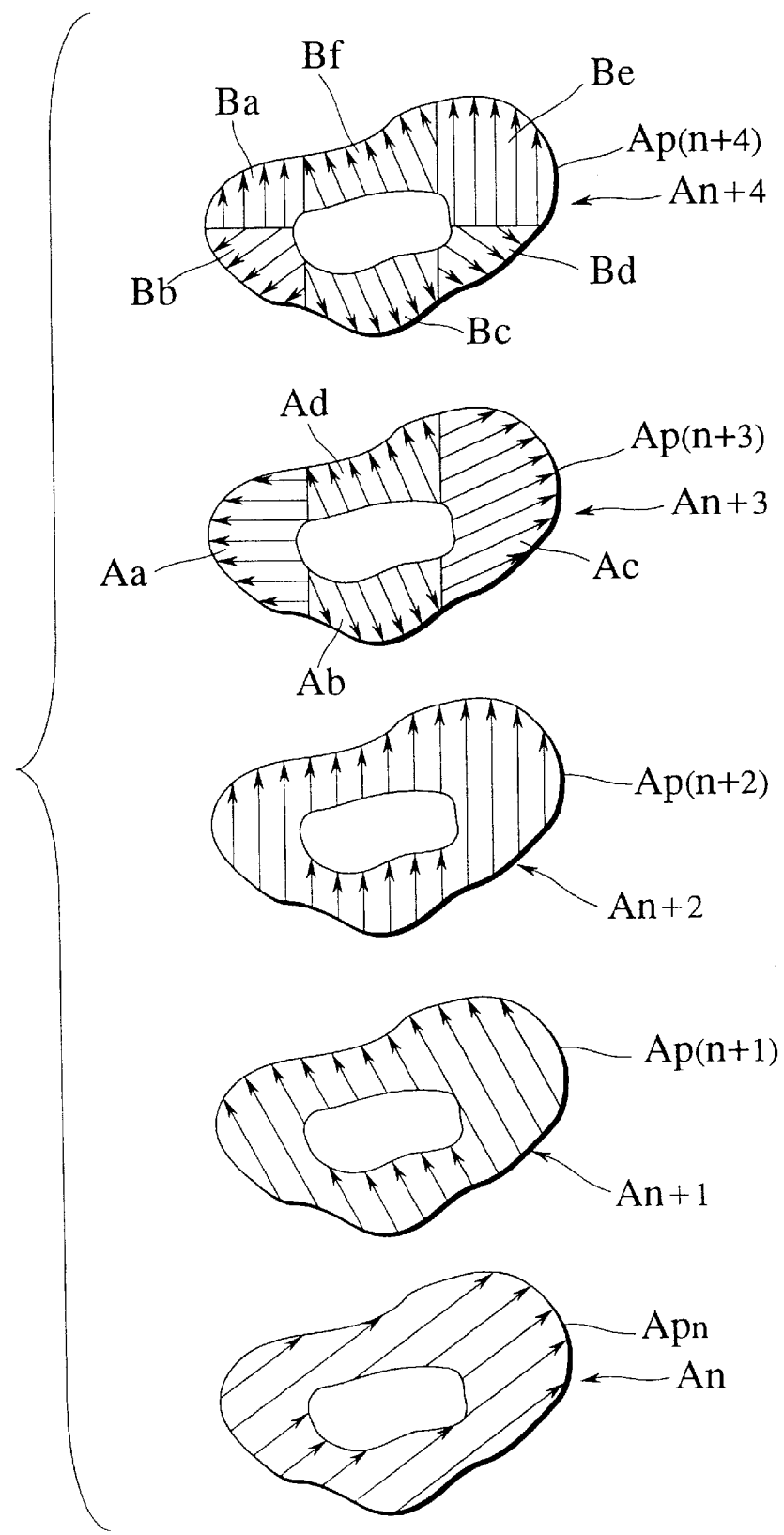
FIG. 12 is an illustration for determining the direction of scanning lines of a laser light in a method of producing a cubic model according to a fifth embodiment of the present invention.

Next, a method of producing a cubic model according to a fifth embodiment of the present invention will be explained with reference to FIG. 12.

In this embodiment, it is arranged that any one of the cubic model producing methods described in the first to fourth embodiments is selected at each time of forming one cured layer $A_n$ to thereby form the respective cured layer $A_n$.

Namely, it is arranged, when forming the cured layer $A_n$, to use the cubic model producing method of the first embodiment, and, when forming the cured layer $A_{n+1}$, to use the cubic model producing method of the second embodiment, and, when forming the cured layer $A_{n+2}$, to use the cubic model producing method of the third embodiment, and, when forming the cured layer $A_{n+3}$, to use the cubic model producing method of the fourth embodiment, and, when forming the cured layer $A_{n+4}$, to use another construction example of the cubic model producing method of the fourth embodiment.

In this cubic model producing method, even if the thicknesses of the respective cured layers $A_n$ are small (0.05 to 0.5 mm or so), and therefore even if the profiles $Ap_n$ to $Ap_{(n+4)}$ of the mutually adjoining cured layers $A_n$ to $A_{n+4}$ are approximate to one another, the direction of the shrinkage that occurs when curing occurs for each of the cured layer $A_n$ to $A_{n+4}$ is dispersed. As a result, the production precision with which the cubic model is produced is improved.

Next, a method of producing a cubic model according to a sixth embodiment of the present invention will be explained with reference to FIG. 13.

In this sixth embodiment, also, although the cubic model producing apparatus used therein is the same as in the case of the first embodiment, there is a further characterizing feature in the way of setting the starting point at which the scanning lines of the laser light 7 start and the terminating point at which these scanning lines end in the CPU 10a of the controller 10.

Figure 13:
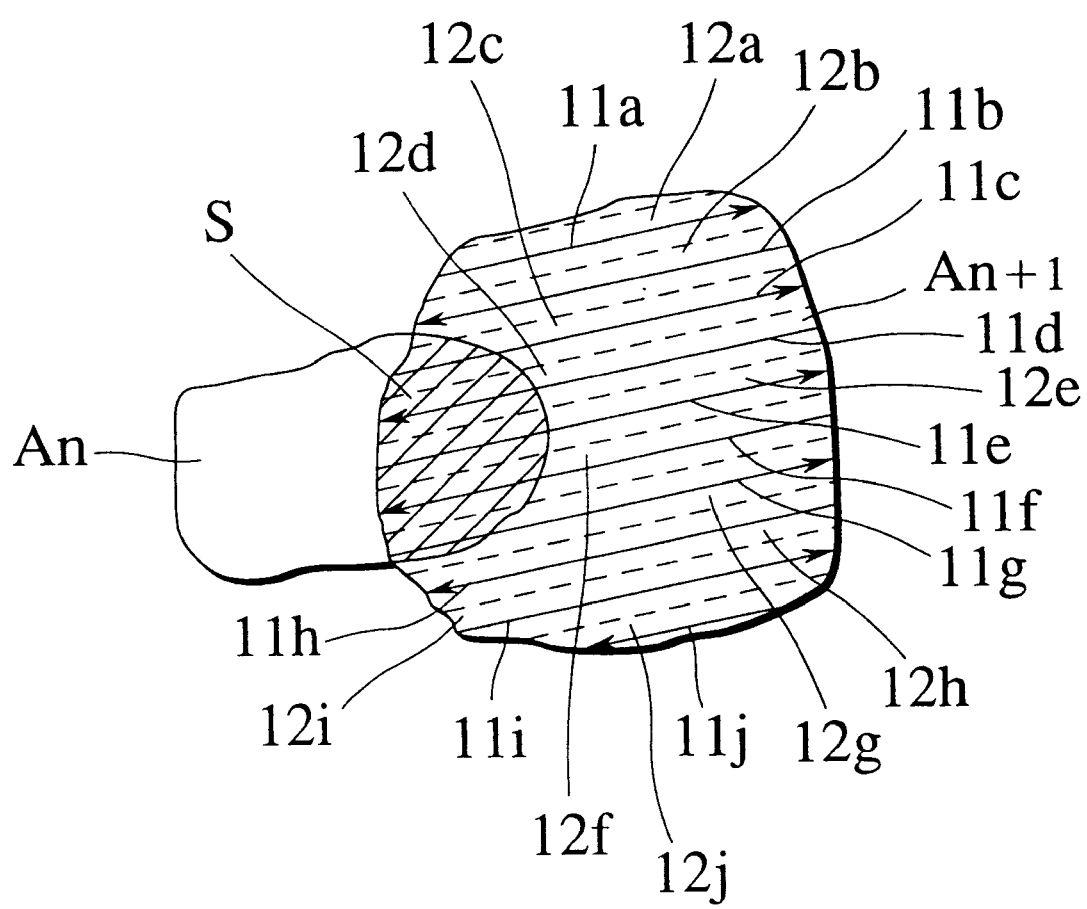
FIG. 13 is an illustration for determining the direction of scanning lines of a laser light in a method of producing a cubic model according to a sixth embodiment of the present invention.

Specifically, in a case where forming, on a previous cured layer formed one layer before, a cured layer whose profile is larger than that of the previous cured layer, namely, in a case where forming, on the cured layer $A_n$, the cured layer $A_{n+1}$ whose profile is larger than that of this cured layer $A_n$, as illustrated in FIG. 13, first, an initial laser light 7 starts to be scanned in a direction indicated by the arrow mark lle from a position S at which the present cured layer $A_{n+1}$ overlaps the cured layer $A_n$ formed one layer before, and this scanning is terminated at a position that has been gotten off from the cured layer $A_n$.

Subsequently, the laser light 7 is sequentially scanned at the upper part from the illustrated linear cured portion 12e, which has been cured by the initial scanning of the laser light 7, in the directions indicated by the arrow marks 11d, 11c, . . . , 11a at predetermined intervals, and, similarly, is sequentially scanned at the lower part from the illustrated linear cured portion 12e in the directions indicated by the arrow marks 11f, 11g, . . . , 11j at predetermined intervals. At this time, the directions of the scannings sequentially performed by the laser light 7 (the directions of the arrow marks 11a, . . . , 11j) are staggered.

And, through the above-described scanning of the laser light 7, the cured layer $A_{n+1}$ is formed on the cured layer $A_n$.

As described above, in the cubic model producing method according to this embodiment, when forming on the cured layer $A_n$ the cured layer $A_{n+1}$ whose profile is larger than that of the cured layer $A_n$, the linear curing resulting from the scanning of the initial laser light 7 starts to occur at the position S at which the cured layer $A_{n+1}$ overlaps the cured layer $A_n$ formed one layer before, and therefore the positional precision of the portion from which the curing starts is ensured while, on the other hand, there occurs no such an unstable state wherein the linear cured portion 12e becomes floated on the liquid surface 3a of the photo-curing resin solution 3. Further, the curing resulting from the linear scanning of the laser light 7 performed at the second time occurs in such a way as to adjoin to the linear cured portion 12e which is formed by the initial scanning of the laser light 7 so as to be high in the positional precision and stabilized on the liquid surface 3a of the photo-curing resin solution 3, and therefore the linear cured portion 12d formed by the second-time scanning of the laser light 7, also, has its positional precision ensured and in addition is brought to a state which is stabilized on the liquid surface 3a of the photo-curing resin solution 3. In the same way to this, the linear cured portions 12c to 12a and 12f to 12j formed by the third-time and thereafter succeeding times scannings of the laser light 7 have their respective positional precisions ensured and are each stabilized on the liquid surface $3a$ of the photo-curing resin solution 3, with the result that the peeling or sagging of the cured layer $A_{n+1}$ as a whole is avoided.

Accordingly, in a case where forming the cubic model shaped like an overhang or bridge as in the case of this embodiment, the supports for preventing the occurrence of peeling or sagging can be set at large intervals, and, especially in a case where producing the cubic model having therein cavity portions each of a complex configuration, e.g., the cubic model shaped like a cylinder head having a water jacket, the occurrence of peeling or sagging in the cured layer constituting an upper wall surface of the water jacket can be avoided even when using no supports.

Further, in the cubic model producing method according to this embodiment, since the scannings of the laser light 7 performed sequentially are performed in staggered directions, the shrinkages of the adjoining linear cured portions $12a$ to $12j$ due to their curing are canceled one another, with the result that the production precision with which the cubic model is produced becomes enhanced.

Figure 14:
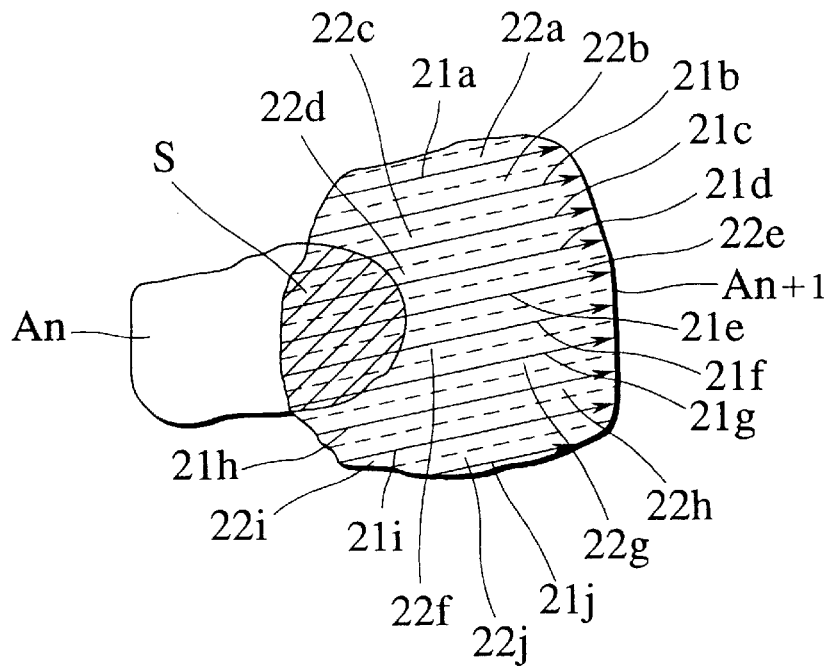
FIG. 14 is an illustration for determining the direction of scanning lines of a laser light in a method of producing a cubic model according to a seventh embodiment of the present invention.

Next, a method of producing a cubic model according to a seventh embodiment of the present invention will be explained with reference to FIG. 14.

The aspect in which the cubic model producing method according to this embodiment differs from the cubic model producing method according to the sixth embodiment is that the directions of the scannings of the laser light 7 (the directions indicated by the arrow marks $21a, \ldots, 21j$) sequentially performed subsequently to the initial scanning of the laser light 7 performed in the direction indicated by the arrow mark $21e$ have been each made the same as the direction of the initial scanning of the laser light 7 (the direction indicated by the arrow mark $21e$). Other constructions are the same as those adopted in the cubic model producing method according to the sixth embodiment.

Namely, in the cubic model producing method according to this embodiment, there are obtained the same effects as those attainable with the cubic model producing method according to the sixth embodiment. In addition, the shrinkages of the adjoining linear cured portions $22a$ to $22j$ due to their curing are biased toward one side, with the result that the production precision with which the cubic model A is produced becomes enhanced.

Figure 15:
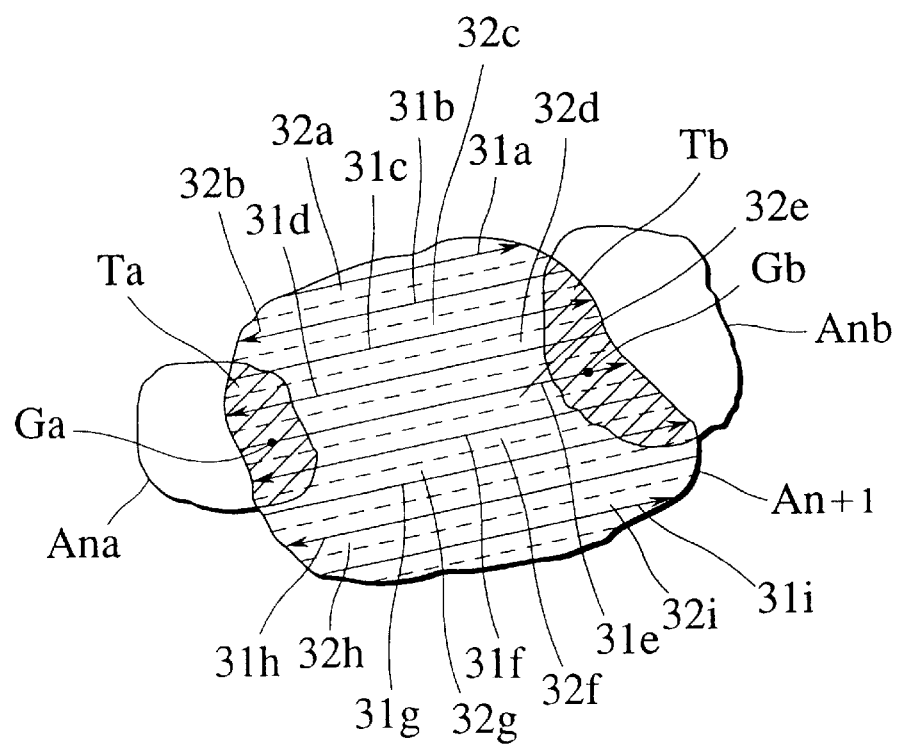
FIG. 15 is an illustration for determining the direction of scanning lines of a laser light in a method of producing a cubic model according to an eighth embodiment of the present invention.

Next, a method of producing a cubic model according to an eighth embodiment of the present invention will be explained with reference to FIG. 15.

In this eighth embodiment, also, although the cubic model producing apparatus used therein is the same as in the case of the first embodiment, there is a further characterizing feature in the way of setting the starting point at which the scanning lines of the laser light 7 start and the terminating point at which these scanning lines end in the CPU $10a$ of the controller 10.

In the cubic model producing method according to this embodiment, in a case where forming the cured layer $A_{n+1}$ on the cured layer $A_n$ formed one layer before and composed of one cured portion $A_n a$ and the other cured portion $A_n b$ spaced away from each other, first, the respective centers of gravity Ga and Gb of the portion Ta of one cured portion $A_n a$ of the cured layer $A_n$ and the portion Tb of the other cured portion $A_n b$ of the cured layer $A_n$ are obtained. Here, the portion Ta and the portion Tb are those where the cured layer $A_n$ formed one layer before and the present cured layer $A_{n+1}$ are respectively overlapped. Then, the direction of a straight line (the direction indicated by the arrow mark $31e$) connecting these centers of gravity Ga and Gb is set as the direction of an initial scanning of the laser light 7. Whereby, the initial scanning of the laser light 7 is started from the portion Ta overlapped on the one cured portion $A_n a$ of the cured layer $A_n$ formed one layer before in the direction indicated by the arrow mark $31e$ and is ended at the portion Tb overlapped on the other cured layer $A_n b$ of the cured layer $A_n$.

Subsequently, the laser light 7 is sequentially scanned at the upper part from the illustrated linear cured portion $32e$, which has been cured by the initial scanning of the laser light 7, in the directions indicated by the arrow marks $31d$, $31c$, $31a$ at predetermined intervals, and, similarly, is sequentially scanned at the lower part from the illustrated linear cured portion $32e$ in the directions indicated by the arrow marks $31f$, $31g$, $\ldots$, $31j$ at predetermined intervals, to thereby form the cured layer $A_{n+1}$. At this time, the directions of the scannings sequentially performed by the laser light 7 (the directions of the arrow marks $31a, \ldots, 31j$) are staggered.

In the cubic model producing method according to this embodiment, between the one cured portion $A_n a$ and the other cured portion $A_n b$ spaced away therefrom, of the cured layer $A_n$ formed one layer before, there is formed in a bridged way the linear cured portion $32e$ cured by the initial scanning of the laser light 7. Therefore, the positional precisions of both the curing starting portion and the curing ending portion are ensured, and simultaneously the linear cured portion $32e$ between the curing starting portion and the curing ending portion comes into a state stabilized without being floated on the liquid surface $3a$ of the photo-curing resin solution 3. Further, the curing resulting from the linear scanning of the laser light 7 performed at the second time occurs in such a way as to adjoin to the linear cured portion $32e$ formed by the initial scanning of the laser light 7, and therefore the linear cured portion $32d$ formed by the second-time scanning of the laser light 7, also, has its positional precision ensured and in addition is stabilized on the liquid surface $3a$ of the photo-curing resin solution 3. In the same way to this, the linear cured portions $32c$ to $32a$ and $32f$ to $32i$ formed by the third-time and thereafter succeeding times scannings of the laser light 7 have their respective positional precisions ensured and are each stabilized on the liquid surface $3a$ of the photo-curing resin solution 3, with the result that the peeling or the like of the cured layer $A_{n+1}$ as a whole is avoided.

Accordingly, in a case where forming the cubic model shaped like a bridge, the supports can be set at large intervals. For example, in even a case where producing the cubic model having therein cavity portions each of a complex configuration, the occurrence of peeling or sagging in the cured layer constituting an upper wall surface of the water jacket can be avoided without using the supports.

Further, in the cubic model producing method according to this embodiment, also, since the scannings of the laser light 7 performed sequentially are performed in staggered directions, the shrinkages of the adjoining linear cured portions $32a$ to $32i$ due to their curing are canceled one another, with the result that the production precision with which the cubic model is produced becomes enhanced.

Figure 16:
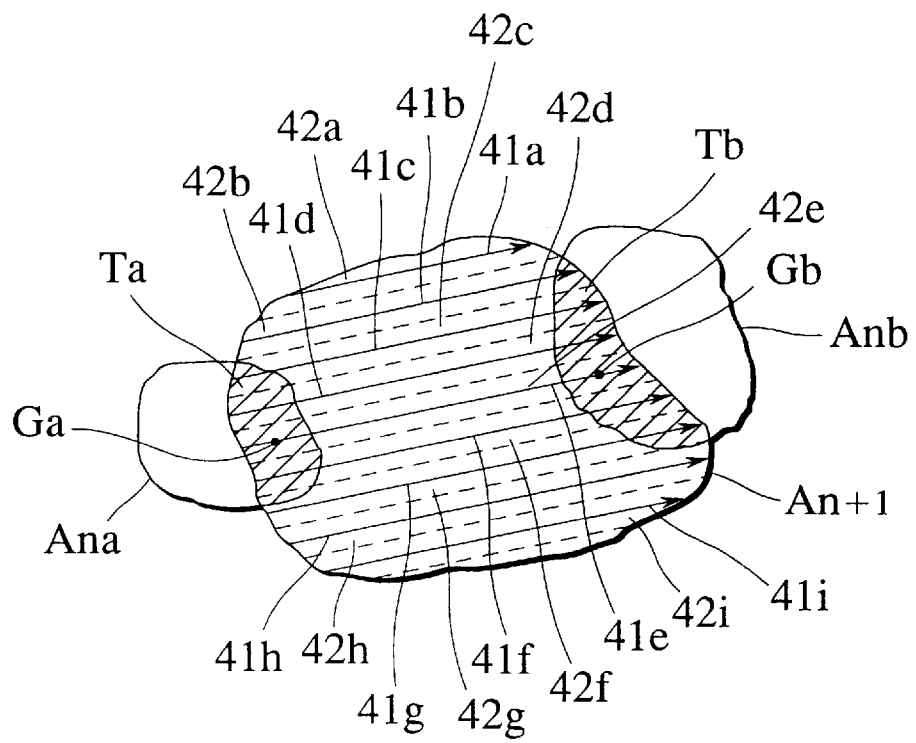
FIG. 16 is an illustration for determining the direction of scanning lines of a laser light in a method of producing a cubic model according to a ninth embodiment of the present invention.

Next, a method of producing a cubic model according to a ninth embodiment of the present invention will be explained with reference to FIG. 16.

The aspect in which the cubic model producing method according to this embodiment differs from the cubic model producing method according to the eighth embodiment is that the directions of the scannings of the laser light 7 (the directions indicated by the arrow marks 41a, . . . , 41i) sequentially performed subsequently to the initial scanning of the laser light 7 performed in the direction indicated by the arrow mark 41e have been each made the same as the direction of the initial scanning of the laser light 7 (the direction indicated by the arrow mark 41e). Other constructions are the same as those adopted in the cubic model producing method according to the eighth embodiment.

Namely, in the cubic model producing method according to this embodiment, there are obtained the same effects as those attainable with the cubic model producing method according to the eighth embodiment. In addition, the shrinkages of the adjoining linear cured portions 42a to 42i due to their curing are biased toward one side, with the result that the production precision with which the cubic model is produced becomes enhanced.

Figure 17:
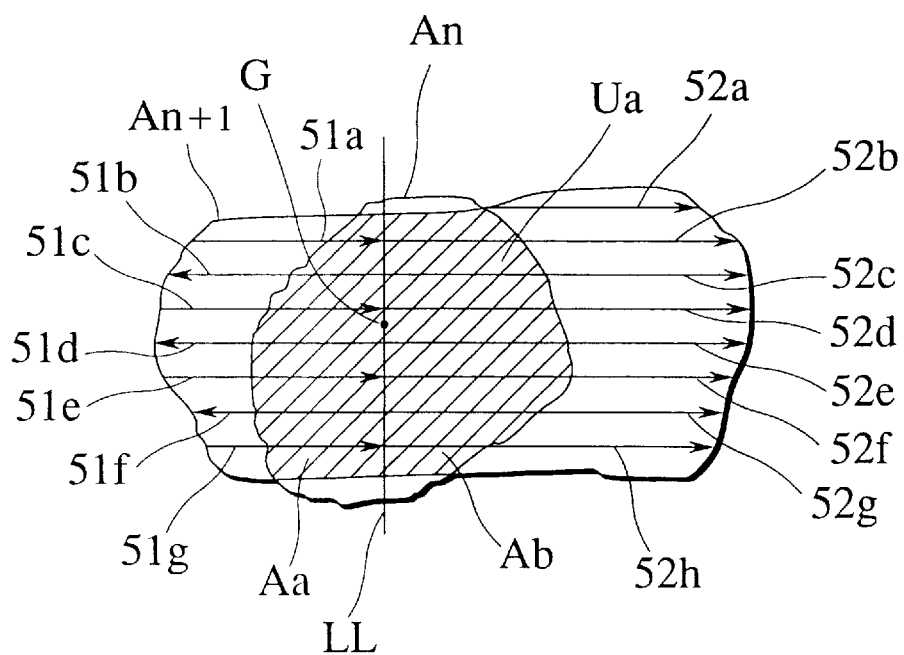
FIG. 17 is an illustration for determining the direction of scanning lines of a laser light in a method of producing a cubic model according to a tenth embodiment of the present invention.

Next, a method of producing a cubic model according to a tenth embodiment of the present invention will be explained mainly with reference to FIG. 17.

In the cubic model producing method according to this embodiment, in a case where forming on the cured layer $A_n$ formed one layer before the cured layer $A_{n+1}$ whose profile is larger than that of the cured layer $A_n$, first, there is obtained the center of gravity G of the portion Ua overlapped on the cured layer $A_n$ formed one layer before the cured layer $A_{n+1}$. Then, the portion Ua overlapped on the cured layer $A_n$ formed one layer before is divided by a straight line LL passing through the center of gravity G to thereby set two photo-scanning regions Aa and Ab.

And, any one of the cubic model producing methods according to the sixth to ninth embodiments is selected with respect to each of the photo-scanning regions Aa and Ab, and the laser light 7 is respectively scanned with respect to the regions Aa and Ab to thereby form the cured layer $A_{n+1}$. In this case, the laser light 7 is scanned independently with respect to the photo-scanning region Aa by using the cubic model producing method according to the sixth embodiment and is scanned independently with respect to the photo-scanning region Ab by using the cubic model producing method according to the seventh embodiment.

As described above, in the above-described cubic model producing method, when forming the cured layer $A_{n+1}$, the linear curing occurring due to the initial scanning of the laser light 7 starts to occur individually from the two respective photo-scanning regions Aa and Ab. Therefore, even when the area of the cured layer $A_{n+1}$ to be formed is especially large compared to the area of the cured layer $A_n$ formed one layer before, or the configuration of the cured layer $A_{n+1}$ to be formed largely differs from the configuration of the cured layer $A_n$ formed one layer before, the positional precision of the curing starting portion in each of the photo-scanning regions Aa and Ab is ensured and in addition the respective linear cured portions (the portions indicated by the arrow marks 51a, 51b, . . . , 51g and the portions indicated by the arrow marks 52a, 52b, . . . , 52h) on the liquid surface 3a of the photo-curing resin solution 3 are prevented from being floated. Accordingly, the peeling or the like of the cured layer $A_{n+1}$ due to the floatation of the linear cured portions is avoided.

Figure 18:
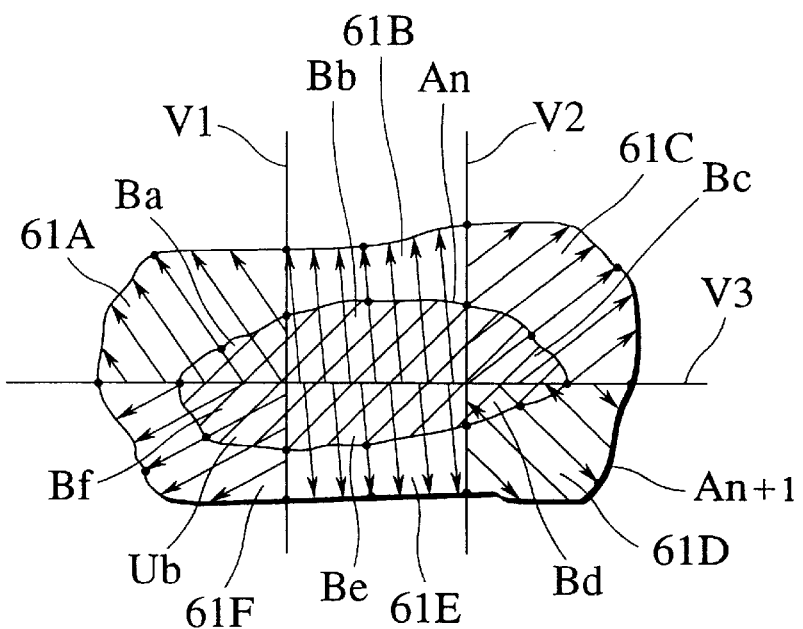
FIG. 18 is an illustration for determining the direction of scanning lines of a laser light in a modification of the method of producing a cubic model according to the tenth embodiment.
Figure 19:
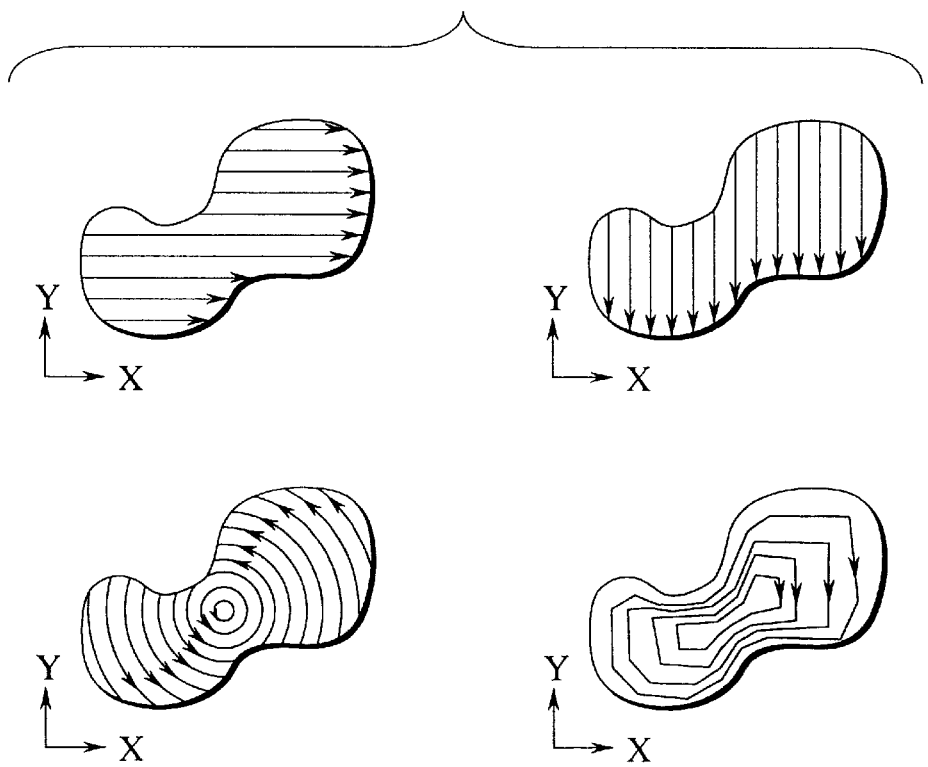
FIG. 19 is an illustration for showing the scanning direction of a laser light in a method of producing a cubic model.
Figure 20:
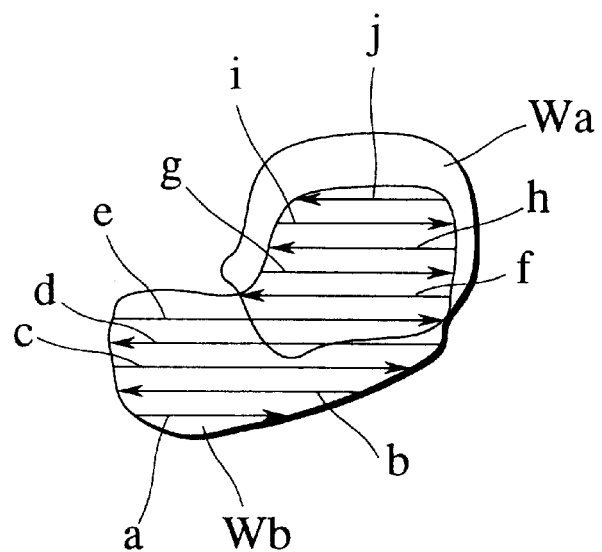
FIG. 20 is an illustration for studying the scanning direction of a laser light in a method of producing a cubic model.
Figure 21A:
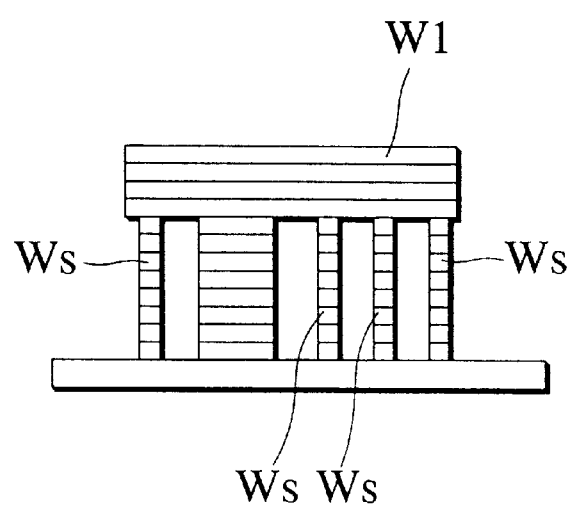
FIGS. 21A and 21B are sectional views respectively of cubic models that have been produced.
Figure 21B:
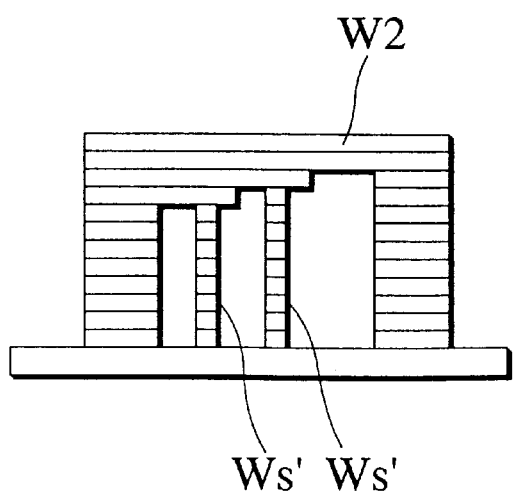

Additionally, although in this embodiment it is arranged that the portion Ua overlapped on the cured layer $A_n$ formed one layer before the cured layer $A_{n+1}$ is divided to thereby set the two photo-scanning regions Aa and Ab, the invention is not limited thereto. As a modification, for example, as illustrated in FIG. 18, the portion Ub overlapped on the cured layer $A_n$ formed one layer before may be divided into six photo-scanning regions Ba, Bb, Bc, Bd, Be and Bf by straight lines V1 and V2 set at a predetermined interval and a straight line V3 substantially orthogonally crossing the lines V1 and V2, whereby it may be arranged to select any one of the cubic model producing methods according to the sixth to ninth embodiments with respect to each of the respective photo-scanning regions Ba, Bb, Bc, Bd, Be and Bf and scan the laser light 7 individually with respect to each of such regions to thereby form the cured layer $A_{n+1}$. By such dividing into a large number of the photo-scanning regions Ba, Bb, Bc, Bd, Be and Bf, even when the area of the cured layer $A_{n+1}$ to be formed is especially large compared to the area of the cured layer $A_n$ formed one layer before, or the configuration of the cured layer $A_{n+1}$ to be formed largely differs from the configuration of the cured layer $A_n$ formed one layer before, the positional precision of the curing starting portion in each of the photo-scanning regions Ba, Bb, Bc, Bd, Be and Bf is ensured and in addition the respective cured portions 61A, 61B, 61C, 61D, 61E and 61F on the liquid surface 3a of the photo-curing resin solution 3 are prevented from being floated therefrom. Accordingly, the peeling or the like of the cured layer $A_{n+1}$ due to the floatation of the cured portions is avoided. If at this time it is arranged to change the scanning direction of the laser light 7 for each of the photo-scanning regions Ba, Bb, Bc, Bd, Be and Bf, the directions of shrinkage at the time of curing are dispersed, namely, the shrinkages when curing occurs are canceled one another, with the result that the production precision with which the cubic model is produced becomes improved.

It is to be noted that applying the scanning direction of the laser light explained in connection with the first to third embodiments to the cubic model producing methods according to the above-described sixth to tenth embodiments is of course possible according to the necessity.

The entire contents of a Patent Application No. TOKUGANHEI 10-37698, with a filling date of Feb. 19, 1998 in Japan and a Patent Application No. TOKUGANHEI 10-75841, with a filling date of Mar. 24, 1998 in Japan upon which the claim for priority and the disclosure of this application, are based are hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A method of producing a three-dimensional object, said three-dimensional object being produced by sequentially laminating a plurality of layers, comprising:

preparing a light source;

preparing a photo-curing resin solution;

setting a plurality of coordinate points at a predetermined interval on a profile of a model section corresponding to a layer of the three-dimensional object which is to be formed;

obtaining information regarding distances between a plurality of said coordinate points; and scanning said photo-curing resin solution with irradiating light emitted from said light source, in correspondence with a direction of a straight line passing through mated coordinate points giving a distance shorter than a maximum value among said distances between a plurality of said coordinate points, to thereby form said layer as a cured layer.

2. A method of producing a three-dimensional object according to claim 1, wherein two points giving a maximum distance among said distances between a plurality of said coordinate points are obtained, and the irradiating light is scanned linearly in parallel a plurality of times along a direction deviated from a direction of a straight line connecting said two points, to thereby form said layer.

3. A method of producing a three-dimensional object according to claim 1, wherein, for each of a plurality of said coordinate points as a basis, the longest straight line giving a maximum distance among said distances between a plurality of said coordinate points is obtained, and the irradiating light is scanned linearly in parallel a plurality of times along a direction of the shortest straight line among said longest straight lines, to thereby form said layer.

4. A method of producing a three-dimensional object according to claim 1, wherein, for each of a plurality of said coordinate points as a basis, the longest straight line giving a maximum distance among said distances between a plurality of said coordinate points is obtained, and the irradiating light is scanned linearly in parallel a plurality of times along a direction of a straight line shorter than a critical length among said longest straight lines, to thereby form said layer, said critical length being determined from a physical value of said photo-curing resin and corresponding to a critical length permitting occurrence of peeling or sagging when said photo-curing resin is cured.

5. A method of producing a three-dimensional object according to claim 1, wherein said model section has a plurality of divided portions, said profile corresponds to profiles of said divided portions, and a plurality of said coordinate points are set on each of said profiles.

6. A method of producing a three-dimensional object according to claim 1, further comprising:
    setting a plurality of coordinate points at a predetermined interval on a profile of a model section corresponding to a layer to be formed adjacent to said cured layer;
    obtaining information regarding distances between a plurality of said coordinate points;
    covering said cured layer said photo-curing resin solution; and
    scanning said photo-curing resin solution covering said cured layer with the irradiating light, in correspondence with a direction of a straight line passing through mated coordinate points giving a distance shorter than a maximum value among said distances between a plurality of said coordinate points, to thereby form said layer adjacent to said cured layer as a cured layer.

7. A method of producing a three-dimensional object according to claim 6, wherein two points giving a maximum distance among said distances between a plurality of said coordinate points are obtained, and the irradiating light is scanned linearly in parallel a plurality of times along a direction deviated from a direction of a straight line connecting said two points, to thereby form said layer adjacent to said cured layer.

8. A method of producing a three-dimensional object according to claim 6, wherein, for each of a plurality of said coordinate points as a basis, the longest straight line giving a maximum distance among said distances between a plurality of said coordinate points is obtained, and the irradiating light is scanned linearly in parallel a plurality of times along a direction of the shortest straight line among said longest straight lines, to thereby form said layer adjacent to said cured layer.

9. A method of producing a three-dimensional object according to claim 6, wherein, using each of a plurality of said coordinate points as a basis, the longest straight line giving a maximum distance among said distances between a plurality of said coordinate points is obtained, and the irradiating light is scanned linearly in parallel a plurality of times along a direction of a straight line shorter than a critical length among said longest straight lines, to thereby form said layer adjacent to said cured layer, said critical length being determined from a physical value of said photo-curing resin and corresponding to a critical length permitting occurrence of peeling or sagging when said photo-curing resin is cured.

10. A method of producing a three-dimensional object according to claim 1, wherein said layer and a layer formed one layer before, have a overlapped portion at which said layer and said layer formed one layer before, overlap each other in a direction along which said layer and said layer formed one layer before, are laminated, and the irradiating light is scanned from a position included in said overlapped portion.

11. A method of producing a three-dimensional object according to claim 1, wherein said layer and a layer formed one layer before have a overlapped portion at which said layer and said layer formed one layer before overlap each other in view of a direction along which said layer and said layer formed one layer before are laminated, and the irradiating light is scanned up to a position outside of said overlapped portion.

12. A method of producing a three-dimensional object according to claim 1, wherein said layer and a layer formed one layer before have a plurality of overlapped portions at which said layer and said layer formed one layer before overlap each other in a direction along which said layer and said layer formed one layer before are laminated, and the irradiating light is scanned from a position included in one of said overlapped portions to a position included in another one of said overlapped portions.

13. A method of producing a three-dimensional object according to claim 1, wherein said light is scanned a plurality of times, and adjacent scanning directions are opposite to each other.

14. A method of producing a three-dimensional object according to claim 1, wherein said light is scanned a plurality of times, and adjacent scanning directions are the same as each other.

15. A method of producing a three-dimensional object according to claim 1, wherein said layer and a previously formed layer formed one layer before, have an overlapped portion at which said layer and said layer formed one layer before overlap each other in view of a direction along which said layer and the previously formed layer are laminated, wherein said overlapped portion has a plurality of divided portions, and wherein the irradiating light is scanned with respect to the respective divided portions.

16. A method of producing a three-dimensional object by sequentially forming a plurality of layers, comprising:
    a) setting a plurality of coordinate points each at a predetermined interval along a profile of a model section corresponding to a layer of the three-dimensional object which is to be formed;
    b) determining a maximally spaced pair of coordinate points;
    c) determining a scan direction which renders parallel scan lines, which each interconnect an opposed pair of coordinate points, shorter than a maximum length line which interconnects maximally spaced coordinate point pairs;

c) scanning a material surface with a material modifying beam from a predetermined beam source so as to follow the scan lines; and repeating steps a)–c) to form the plurality of layers and produce the three-dimensional object.

17. A method as set forth in claim 16, wherein the material modifying beam is a laser beam.

18. A method of producing a three-dimensional object comprising:

dividing a shape of a three-dimensional object into a stack of hypothetical, horizontal, shaped slices;

determining an outer profile of each slice, determining, based on the extracted profile of each slice, a line which spans the slice in predetermined spatial relationship with a shape of the slice;

determining, based on a predetermined parameter of the line, a plurality of scan lines for each slice which are selected to avoid a predetermined detrimental effect in the three-dimensional object;

scanning a fluid base material, which is contained in an accommodation vessel, along the plurality of scan lines for a selected slice, with an irradiating beam which turns the fluid base material into a solid layer having a shape which is the same as the selected slice; and immersing the solid layer in a predetermined amount of fluid base material and repeating the scanning for a sequentially subsequent slice which is located above the selected slice so as to form another solid layer which becomes unitary with the solid layer thereunder, and repeating the irradiating and immersing steps for each remaining slice until the three-dimensional object is developed.

19. A method as set forth in claim 18, further comprising the steps of:

dividing the shape into regions and determining a line for each of the regions;

determining, based on the line determined for a region, a direction of a plurality of scan lines for that region.

20. A method as set forth in claim 18, further comprising the steps of:

initiating at least one scan line for a slice which at least partially overlies a previously formed layer and which extend beyond an edge of the previously formed layer, at a site on the slice which overlies the previously formed layer and terminating the at least one scan line at a site which is located so that overlap with the previously formed layer is absent.

21. An apparatus for producing a three-dimensional object comprising:

means for dividing a shape of a three-dimensional object into a stack of hypothetical, horizontal, shaped slices;

means for determining an outer profile of each slice, means for determining, based on the extracted profile of each slice, a line which spans the slice in predetermined spatial relationship with a shape of the slice;

means for determining, based on a predetermined parameter of the line, a plurality of scan lines for each slice which are selected to avoid a predetermined detrimental effect in the three-dimensional object;

means for scanning a fluid base material, which is contained in an accommodation vessel, along the plurality of scan lines for a selected slice, with an irradiating beam which turns the fluid base material into a solid layer having a shape which is the same as the selected slice; and means for immersing the solid layer in a predetermined amount of fluid base material and repeating the scanning for a sequentially subsequent slice which is located above the selected slice so as to form another solid layer which becomes unitary with the solid layer thereunder, and repeating the irradiating and immersing steps for each remaining slice until the three-dimensional object is developed.

* * * * *